(12) United States Patent
Cisler et al.

(10) Patent No.: US 11,449,389 B2
(45) Date of Patent: Sep. 20, 2022

(54) TECHNIQUES FOR PERFORMING INCREMENTAL DATA BACKUPS

(71) Applicant: Apple Inc., Cupertino, CA (US)

(72) Inventors: Pavel Cisler, Redwood City, CA (US);
Pavel Sokolov, Menlo Park, CA (US);
Dominic B. Giampaolo, Lewiston, ME (US); Eric A. Weiss, Paris (FR);
Christopher A. Wolf, Bahama, NC (US)

(73) Assignee: Apple Inc., Cupertino, CA (US)

( * ) Notice: Subject to any disclaimer, the term of this patent is extended or adjusted under 35 U.S.C. 154(b) by 929 days.

(21) Appl. No.: 15/841,283

(22) Filed: Dec. 13, 2017

(65) Prior Publication Data

US 2018/0349227 A1    Dec. 6, 2018

Related U.S. Application Data

(60) Provisional application No. 62/514,731, filed on Jun. 2, 2017.

(51) Int. Cl.
*G06F 11/14* (2006.01)
*G06F 16/11* (2019.01)
*G06F 16/16* (2019.01)
*G06F 16/17* (2019.01)

(52) U.S. Cl.
CPC ........ *G06F 11/1451* (2013.01); *G06F 16/128* (2019.01); *G06F 16/166* (2019.01); *G06F 16/1727* (2019.01); *G06F 2201/84* (2013.01)

(58) Field of Classification Search
CPC .......................... G06F 11/1451; G06F 16/128
See application file for complete search history.

(56) References Cited

U.S. PATENT DOCUMENTS

| | | | |
|---|---|---|---|
| 7,900,088 B1 * | 3/2011 | Pawar | G06F 16/1734 714/21 |
| 8,533,189 B2 | 9/2013 | Ingen et al. | |
| 9,171,002 B1 | 10/2015 | Mam et al. | |
| 9,514,140 B2 | 12/2016 | Yueh | |
| 2011/0283113 A1 | 11/2011 | Moffat et al. | |

(Continued)

FOREIGN PATENT DOCUMENTS

CN         103164295 A         6/2013

*Primary Examiner* — Jensen Hu
(74) *Attorney, Agent, or Firm* — Dickinson Wright RLLP

(57) ABSTRACT

The embodiments set forth techniques for performing incremental backups of a source file system volume (FSV) managed by a source computing device. According to some embodiments, the source computing device can be configured to generate a current snapshot of the source FSV, where the current snapshot complements a previous snapshot of the source FSV (e.g., established during a previous backup). In some cases, to free up storage space, the data for files belonging to the source FSV can be stripped from the previous snapshot (where metadata for the files remains intact). Next, the source computing device can generate, within a destination storage device, a second snapshot of a destination FSV (that corresponds to the source FSV). In turn, the source computing device identifies changes made to the source FSV based on the current snapshot and the previous snapshot, and reflects the changes within the second snapshot of the destination FSV.

20 Claims, 12 Drawing Sheets

(56) References Cited

U.S. PATENT DOCUMENTS

| | | | |
|---|---|---|---|
| 2013/0073819 A1* | 3/2013 | Havewala | G06F 11/004 |
| | | | 711/162 |
| 2013/0185509 A1 | 7/2013 | Golosovker et al. | |
| 2014/0325267 A1* | 10/2014 | Liu | G06F 11/1469 |
| | | | 714/15 |
| 2018/0089033 A1* | 3/2018 | Tamura | G06F 16/178 |
| 2019/0220367 A1* | 7/2019 | Kashi Visvanathan | |
| | | | G06F 11/1448 |

\* cited by examiner

210

TECHNIQUES FOR PERFORMING INCREMENTAL DATA BACKUPS

CROSS-REFERENCE TO RELATED APPLICATIONS

The present application claims the benefit of U.S. Provisional Application No. 62/514,731, entitled "TECHNIQUES FOR PERFORMING INCREMENTAL DATA BACKUPS," filed Jun. 2, 2017, the content of which is incorporated herein by reference in its entirety for all purposes.

FIELD

The described embodiments relate generally to performing incremental data backups. More particularly, the described embodiments involve utilizing snapshots of file system volumes (that store data) to increase the efficiency by which the data can be periodically backed up to destination devices (e.g., network drives).

BACKGROUND

Computing devices have become the primary means through which users manage their personal/work-related data, e.g., digital media items, documents, emails, and so on. In this regard, it can be important for users to regularly backup their data so that recovery procedures can be carried out in an organized manner when necessary (e.g., when a data loss or corruption occurs). A popular approach for a given computing device to carry out a data backup procedure involves utilizing a mass storage device—e.g., a network-based storage drive—that is accessible to the computing device. In particular, the computing device can provide a copy of its data (e.g., stored on a local storage device) to the mass storage device, which can then be used at a later time as a basis to carry out a recovery procedure when necessary. Notably, the mass storage device typically will have a storage capacity that is substantially larger than the local storage device of the computing device. This can beneficially enable chronological versions of the data to be established, thereby increasing the granularity by which recovery procedures can be executed.

Despite the foregoing benefits that can be afforded using mass storage devices to carry out data backups, several performance issues continue to persist that have yet to be properly addressed. For example, when a computing device is carrying out an incremental data backup procedure, it can be configured to wastefully copy all of its data to a mass storage device, even when only small number of changes have occurred to the data since a previous data backup procedure was executed. One approach that attempts to address this deficiency involves the computing device comparing its current data to the data stored on the mass storage device, and copying only the changes over to the mass storage device. However, this approach suffers from latency issues due to the considerable amount of back-and-forth communications that must take place between the computing device and the mass storage device to properly identify the changes. Moreover, these latency issues are exacerbated in most scenarios as the computing device typically communicates with the mass storage device over a network connection that has constrained bandwidth.

Consequently, there exists a need for a more efficient approach for performing incremental data backups from a computing device to a mass storage device.

SUMMARY

Representative embodiments set forth herein disclose various techniques for performing incremental data backups. More particularly, the described embodiments involve utilizing snapshots of file system (FS) volumes (that store data) to increase the efficiency by which the data can be periodically backed up to destination devices (e.g., network drives)

According to some embodiments, a method for performing a backup of a source file system volume (FSV) associated with a source computing device is disclosed. The method can include the steps of (1) generating, at the source computing device, a current snapshot of the source FSV in response to a request to perform an incremental backup of the source FSV. Specifically, the current snapshot can complement a previous snapshot of the source FSV (e.g., generated in conjunction with a previous backup). In some cases, to free up storage space, the actual data for files belonging to the source FSV can be stripped from the previous snapshot (with metadata for the files remaining intact). A subsequent step of the method can include (2) generating, within a destination storage device, a second snapshot of a destination FSV, where the source FSV corresponds to the destination FSV. A next step of the method can include (3) identifying changes that have been made to the source FSV based on the current and previous snapshots managed by the source computing device. A next step of the method can include (4) reflecting the changes within the second snapshot of the destination FSV. A final step of the method can include (5) generating a third snapshot of the destination FSV to finalize the changes made to the second snapshot of the destination FSV. In this manner, the backup is performed efficiently as the source computing device can minimize the amount of back-and-forth communications that take place with the destination storage device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
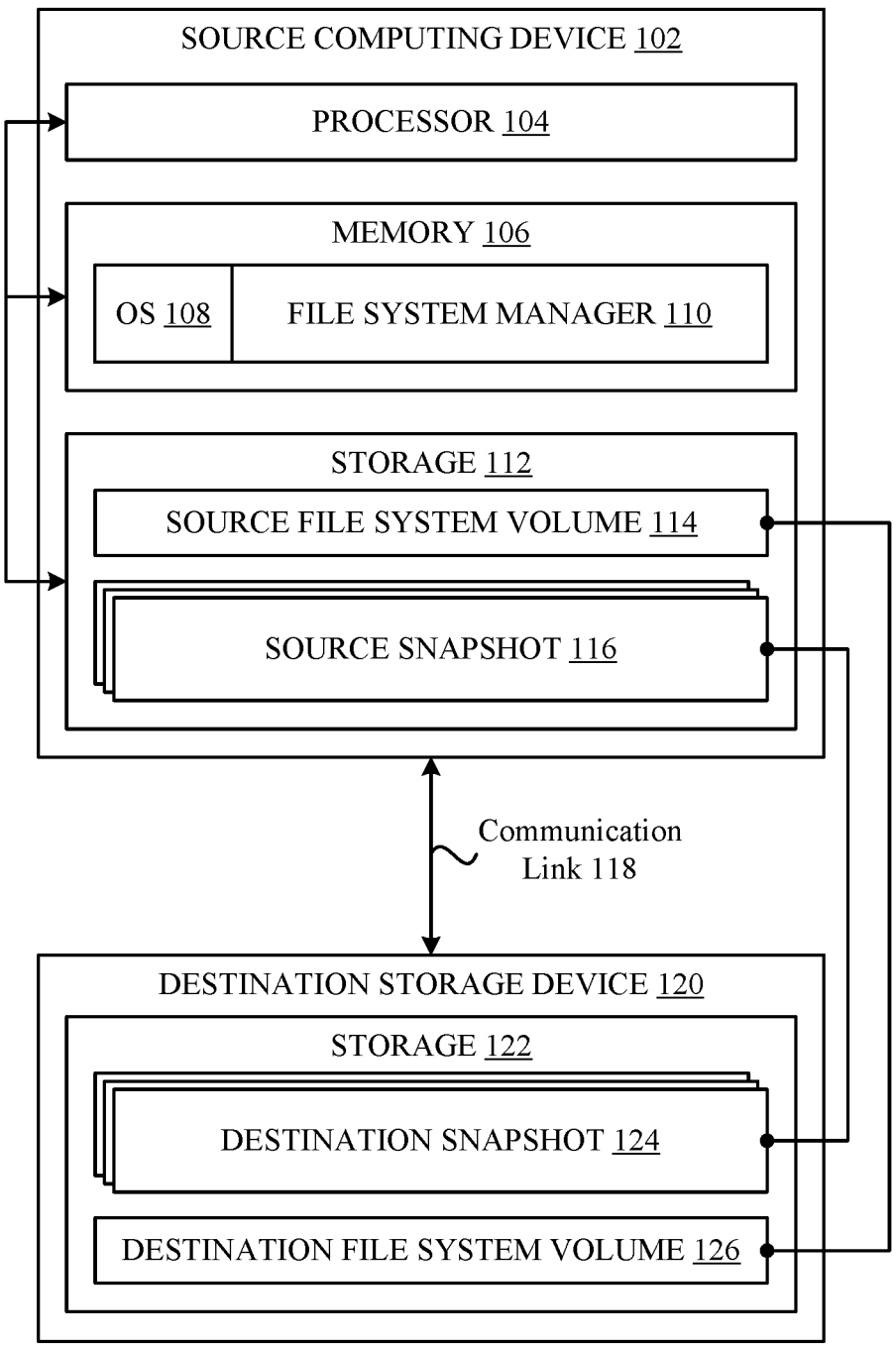
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The techniques described herein involve performing incremental backups of a source file system volume managed by a source computing device. In particular, the techniques can involve utilizing source snapshots of the source file system volume to increase the efficiency at which the incremental backups of the source file system volume can be performed. According to some embodiments, a "local" backup of the source file system volume can involve generating a current source snapshot of the source file system volume and storing the current source snapshot locally on the source computing device. Additionally, a "remote" backup can involve generating a current source snapshot of the source file system volume locally on the source computing device—as well as (1) generating a current destination snapshot of a destination file system volume that (i) corresponds to the source file system volume, and (ii) is stored on a destination storage device (e.g., a network drive), and (2) storing the current destination snapshot on the destination storage device. Notably, when a remote backup is completed, the correspondingly-generated current source snapshot can be flagged as a "reference" source snapshot that serves as a basis to identify changes that should be propagated to the destination storage device when subsequent remote backups are performed. For example, when performing a subsequent remote backup, the current source snapshot (generated in conjunction with performing the subsequent remote backup) can be compared against the reference source snapshot (generated during the last remote backup) to identify different changes that have occurred since the last remote backup was performed. In turn, the changes can be propagated into the destination file system volume/destination snapshots in accordance with a variety of techniques that are described in greater detail herein.

Additionally, it is noted that situations can arise in which it can be desirable to free up storage space at the source computing device when performing local/remote backups. For example, the content stored in the source file system volume—as well as the various source snapshots that are generated in conjunction with the local/remote backups—can result in situations where there is an insufficient amount of available storage space for generating additional source snapshots when attempting to carry out subsequent local/remote backups. This can also occur outside of backup procedures performed at the source computing device 102, e.g., when attempting to create a new file within the source computing device 102. In any case, to free up storage space (e.g., to accommodate additional snapshots, to create the new file, etc.), the actual data for files can be stripped from previous source snapshots (e.g., the reference snapshot) at the source computing device. However, metadata for the files can be left intact within the previous source snapshots to enable the source computing device to continue to be able to identify changes that have occurred between the times at which a current source snapshot and a previous source snapshot (e.g., the reference source snapshot) are established. The metadata can include, for example, directory structures (e.g., folder/file hierarchies), file properties (e.g., name, dates, permissions, extended attributes), and so on. It is noted that the foregoing metadata breakdown is merely exemplary, and that the metadata can include any of the content included in the source file system volume without departing from the scope of this disclosure. In this manner, the source computing device can continue to exploit the benefits afforded by the snapshot-based backup techniques described herein even as available storage space becomes limited within the source computing device.

A more detailed discussion of these techniques is set forth below and described in conjunction with FIGS. 1-4, which illustrate detailed diagrams of systems and methods that can be used to implement these techniques.

FIG. 1 illustrates a block diagram 100 of different components of a source computing device 102 that is configured to implement the various techniques described herein, according to some embodiments. More specifically, FIG. 1 illustrates a high-level overview of the source computing device 102, which, as shown, can include at least one processor 104, at least one memory 106, and at least one storage 112. According to some embodiments, the processor 104 can be configured to work in conjunction with the memory 106 and the storage 112 to enable the source computing device 102 to implement the various techniques set forth in this disclosure. According to some embodiments, the storage 112 can represent a storage device that is accessible to the source computing device 102, e.g., a hard disk drive, a solid-state drive, and the like. Additionally, the source computing device 102 can include communications components/software (not illustrated in FIG. 1) that enable the source computing device 102 to communicate with other computing devices, including a destination storage device 120 that includes a storage 122 (e.g., a hard drive, a solid-state drive (SSD), etc.). The destination storage device 120 can represent, for example, an external storage device, a network storage device, and so on. As also shown in FIG. 1, the source computing device 102 and the destination storage device 120 can be configured to communicate via a communication link 118 (e.g., a Universal Serial Bus (USB) connection, a Firewire connection, a Thunderbolt connection, an Ethernet/WiFi connection, and so on).

As shown in FIG. 1, the storage 112 can be configured to store the data of different source file system volumes (FSVs) that can be mounted at the source computing device 102. For example, the processor 104 can be configured to mount a source file system volume 114 that includes an OS 108 that is compatible with the source computing device 102. According to some embodiments, the OS 108 can enable a file system manager 110 to execute on the source computing device 102. As is well-understood, the OS 108 can also enable a variety of processes to execute on the source computing device 102, e.g., OS daemons, native OS applications, user applications, and the like. According to some embodiments, the source file system volume 114 can also include user data that is accessible at the source computing device 102 by way of the OS 108. However, it is noted that, in some configurations, such user data can instead be stored in a separate file system volume that can be concurrently mounted on the source computing device 102 and accessible to the OS 108. According to some embodiments, the source file system volumes 114 can be members of a same (or different) logical container and can be configured to utilize the same physical storage space within the storage 112. This beneficially provides enhanced flexibility as each source file system volume 114 can consume space within the storage 112 on an as-needed basis. In addition, each source file system volume 114 can be configured to enforce particular configurations (e.g., permissions, ownerships, encryption schemes, etc.) that are independent from the configurations of other source file system volumes 114 managed by the source computing device 102.

Although not illustrated in FIG. 1, it is noted that the file system volumes described herein can include a variety of folders/files that are organized in a hierarchical manner. In this regard, each of the files can be associated with a collection of extents that define the manner in which the file is stored on the underlying storage device (e.g., the storage 112). For example, for a given file, each extent can include (1) a logical offset that defines how the extent is logically positioned within the file, (2) a starting address of a physical block of the underlying storage device, and (3) a number of contiguous physical blocks that follow the starting address. In this manner, different portions of the file can be stored across different areas of the underlying storage device, thereby providing a highly-flexible environment in which file management operations can take place—e.g., under the "copy-on-write" paradigm described in detail herein.

According to some embodiments, the storage 112 can also be configured to store source snapshots 116 of the source file system volume 114 on the source computing device 102. In particular, each source snapshot 116 can be configured to include data that can be used to restore the source file system volume 114 to a particular point in time. According to some embodiments, and as described in greater detail herein, the file system manager 110 can be configured to service requests for generating source snapshots 116 of the source file system volume 114, e.g., in conjunction with performing backup procedures. In particular, the file system manager 110 can be configured to gather data of the source file system volume 114, generate a source snapshot 116 based on the data, and then provide the source snapshot 116 to the storage 112. For example, when a request to generate a first (i.e., an initial) source snapshot 116 of the source file system volume 114 is received, the file system manager 110 can respond by carrying out a series of operations to satisfy the request. In particular, because this is an initial source snapshot 116 (i.e., no existing/prior source snapshots 116 are associated with the source file system volume 114), it is not necessary for the file system manager 110 to rely on analyzing a previous source snapshot 116 (i.e., to identify changes) when gathering data to generate the first source snapshot 116. Instead, the file system manager 110 can gather the data of the source file system volume 114—e.g., all of the data, or a subset of the data, depending on a configuration—when generating the first source snapshot 116 for the file system volume.

According to some embodiments, the file system manager 110 can also establish various data structures and manage input/output (I/O) operations to the source file system volume 114 in a manner that enables the file system manager 110 to efficiently capture changes made to the source file system volume 114 over time. For example, the file system manager 110 can be configured to implement a "copy-on-write" approach that involves writing any changes to a particular file into a new area of memory, and updating the appropriate data structures to point into the new area of memory. Moreover, the file system manager 110 can maintain one or more file system event logs that enable the file system manager 110 to efficiently recall changes that were made to the source file system volume 114. Using this approach, the file system manager 110 can increase by the efficiency by which subsequent source snapshots 116 are generated. For example, at a later time, the file system manager 110 can receive a subsequent request to generate a second source snapshot 116 of the source file system volume 114. In response, the file system manager 110 can (1) identify the first source snapshot 116 associated with the source file system volume 114, and (2) generate a second source snapshot 116 that captures the changes that have occurred to the source file system volume 114 since the first source snapshot 116 was generated.

As described in greater detail herein, the various snapshot capabilities implemented by the file system manager 110 can be used to increase the efficiency by which backups of the source file system volume 114 can be carried out both (1) "locally" at the source computing device 102, and (2) "remotely" in conjunction with the destination storage device 120 (described below). In particular, performing a local backup can involve establishing different source snapshots 116 (of the source file system volume 114) that are stored locally on the source computing device 102 (e.g., within the storage 112). According to some embodiments, the file system manager 110 can perform the local backups according to a time schedule, e.g., every hour, every day, etc., regardless of whether the destination storage device 120 is available. In this manner, the file system manager 110 can enable users to access restore points at fine-level granularity, which can be beneficial in that the users can easily undo undesired changes (e.g., file deletions) that might otherwise be permanent.

Additionally, as mentioned above, the various snapshot capabilities implemented by the file system manager 110 can be used to increase the efficiency by which backups of the source file system volume 114 can be carried out "remotely" in conjunction with the destination storage device 120. In particular, the file system manager 110 can be configured to establish, at the destination storage device 120, destination snapshots 124 of a destination file system volume 126, where (1) the destination snapshots 124 are associated with the source snapshots 116, and (2) the destination file system volume 126 is associated with the source file system volume 114. It is noted that the destination snapshots 124 can be stored within the destination file system volume 126 (despite being illustrated as separate from one another). According to some embodiments, the file system manager 110 can be configured to perform a remote backup with the destination storage device 120 each time the destination storage device 120 becomes available (e.g., when a user returns home), each time a periodic time frame is satisfied (e.g., every day while the destination storage device 120 remains available), and so on. In this manner, the file system manager 110 can efficiently establish both local backups and remote backups of the source file system volume 114, which can provide the benefit of highly redundant backups and fine-granularity restorations while minimizing storage space/latency parameters.

Accordingly, FIG. 1 sets forth an overview of different components/entities that can be included in the source computing device 102 to enable the embodiments described herein to be properly implemented. A more detailed description of the various functionalities of these components/entities will now be provided below in conjunction with FIGS. 2A-2H and FIGS. 3A-3B.

Figure 2A:
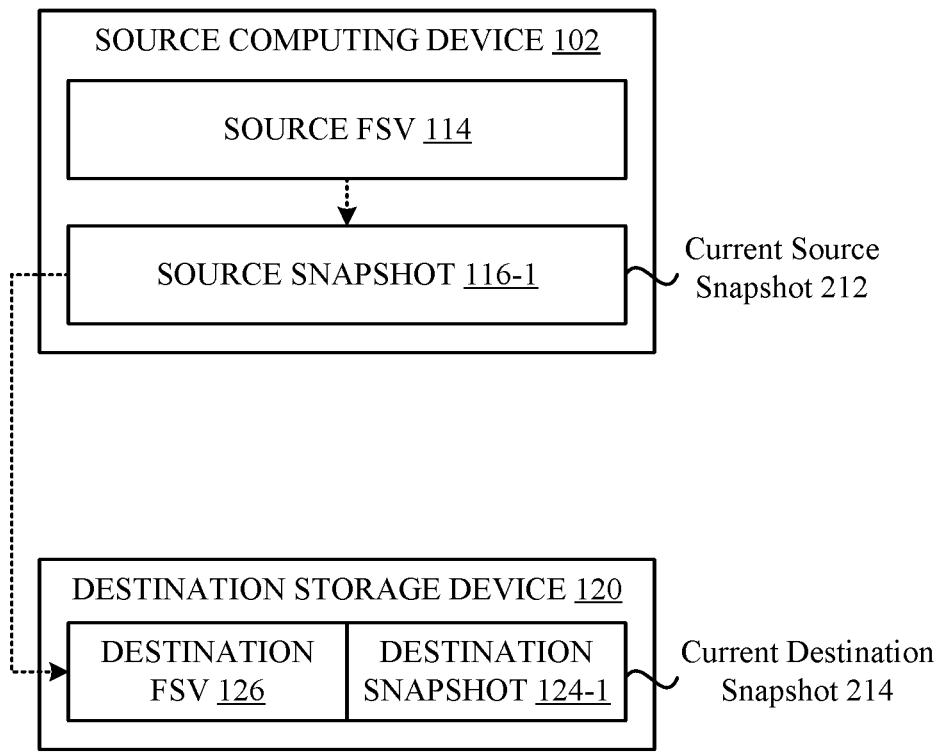
FIGS. 2A-2H illustrate conceptual diagrams of an example scenario in which the source computing device performs both local and remote backups over a period of time, according to some embodiments.

FIGS. 2A-2H illustrate conceptual diagrams of an example scenario in which the source computing device 102 performs both local and remote backups over a period of time, according to some embodiments. As shown in FIG. 2A, a first step 210 can involve the source computing device 102 carrying out a preliminary remote backup in conjunction with the destination storage device 120. In one example, the preliminary remote backup can take place when a user purchases and configures the destination storage device 120 as a backup target for the source computing device 102. In another example, the preliminary remote backup can take place when the source computing device 102 is purchased and registered with the destination storage device 120 as a trusted device. In yet another example, the preliminary remote backup can take place when the source computing device 102 and the destination storage device 120 are known to one another, and the source computing device 102 was restored to a "factory" state (and therefore requires an initial remote backup to be performed).

In any case, at step 210, the source computing device 102—in particular, the file system manager 110—can be configured to generate a source snapshot 116-1 (labeled "current source snapshot 212" in FIG. 2A) of a file system volume that is targeted by the preliminary remote backup (e.g., the source file system volume 114). As previously described herein, the current source snapshot 212 can be utilized as an immutable representation of the source file system volume 114 at the time the current source snapshot 212 is established. In this regard, the current source snapshot 212 represents a stable capture of the source file system volume 114 that can be backed up to the destination storage device 120, which is described below in greater detail. Beneficially, this stable version can eliminate the need to perform successive analyses of the source file system volume 114 (subsequent to the completion of the preliminary backup procedure) to identify any changes that were made to the source file system volume 114 "in-flight" while the preliminary backup procedure was being performed, which can be time-consuming and error-prone.

Additionally, the file system manager 110 can be configured to generate a destination file system volume 126 on the destination storage device 120 that is formed in accordance with the source file system volume 114/current source snapshot 212. For example, given step 210 involves a first remote backup procedure, the file system manager 110 can establish the destination file system volume 126 by copying the content from the source file system volume 114 in accordance with the current source snapshot 212. Additionally, as shown in FIG. 2A, the file system manager 110 can also establish a destination snapshot 124-1—labeled "current destination snapshot 214" in FIG. 2A—such that the current destination snapshot 214 corresponds to the current source snapshot 212. In this regard, at the conclusion of the preliminary backup procedure, either of the current source snapshot 212 and the current destination snapshot 214 can be utilized to restore the source file system volume 114 to a previous state (e.g., in the event that the source file system volume 114 is corrupted, deleted, or desired to be accessed for any reason, etc.).

As a brief aside, it is noted that the file system manager 110 can be configured to implement a set of rules when identifying the folders/files (also referred to herein as "items") in the source file system volume 114 that should be backed up to the destination storage device 120. For example, the file system manager 110 can be configured to exclude particular items based on their locations, sizes, types, and so on. Additionally, scenarios can occur in which the file system manager 110 encounters an item that cannot be accessed, e.g., a container for a cloud-based file that has not been synchronized for local storage at the source computing device 102, an item that is protected/encrypted, and so on. In any case, the file system manager 110 can be configured to earmark the items and attempt to back them up at a later time, thereby increasing the overall robustness of the different backup procedures set forth herein.

Returning now to FIG. 1, after establishing the current destination snapshot 214, the file system manager 110 can also be configured to flag (e.g., using metadata, a Boolean value, etc.) the current source snapshot 212 as a "reference" source snapshot 116. As described in greater detail herein, this "reference" snapshot can be used as a basis for the file system manager 110 to identify changes that have been made to the source file system volume 114 since the last remote backup occurred—even when additional source snapshots 116 are established on the source computing device 102 by way of local backups that take place between the remote backups, which is described below in greater detail in conjunction with FIG. 2B. In other words, any source snapshot 116 on the source computing device 102 that is marked as a reference source snapshot can be identified by the file system manager 110 as the last remote backup that was performed with the destination storage device 120. In this manner, the file system manager 110 can properly identify the changes that should be propagated to the destination storage device 120.

Figure 2B:
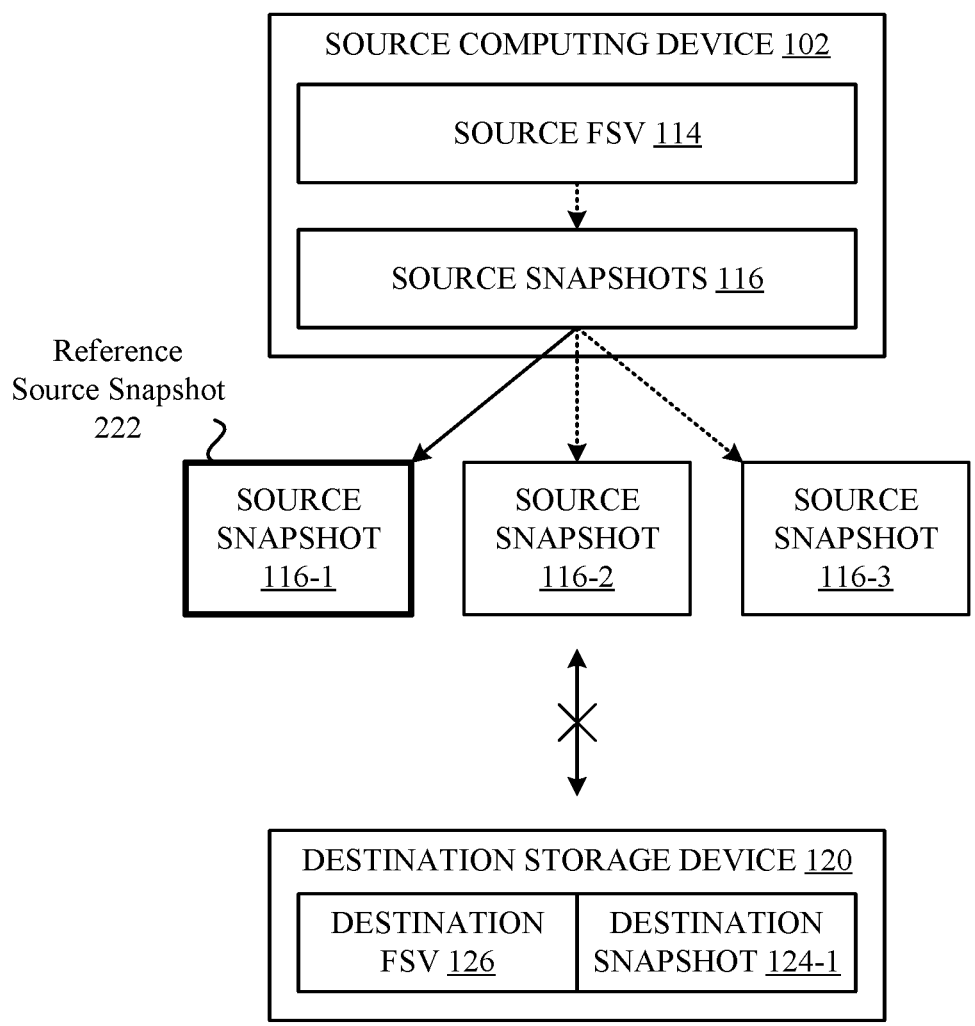

Next, in FIG. 2B, a second step 220 can involve the source computing device 102 establishing different source snapshots 116 in conjunction with local backups that are performed by the source computing device 102. This can occur, for example, when the source computing device 102 is no longer communicatively coupled to the destination storage device 120, when the destination storage device 120 is offline, and so on. However, it is noted that the file system manager 110 can be configured to perform such local backups even when the destination storage device 120 is accessible, e.g., under scenarios in which the local backups are scheduled to occur at a higher frequency in comparison to the remote backups. In any case, as shown in FIG. 2B, step 220 can involve the file system manager 110 can establishing two additional source snapshots 116-2 and 116-3 (in conjunction with two local backups), where the source snapshot 116-1 is flagged as a reference source snapshot 222 (as described above in conjunction with FIG. 2A). At this point in time, the file system manager 110 is able to locally-restore the source file system volume 114 to any one of the three different states that correspond to the source snapshots 116-1, 116-2, and 116-3. Additionally, the file system manager 110 can also remotely-restore (e.g., upon communicatively coupling with the destination storage device 120)—using the destination snapshot 124-1—the source file system volume 114 to the state that corresponds to the initial preliminary backup carried out in conjunction with step 210 of FIG. 2A.

Figure 2C:
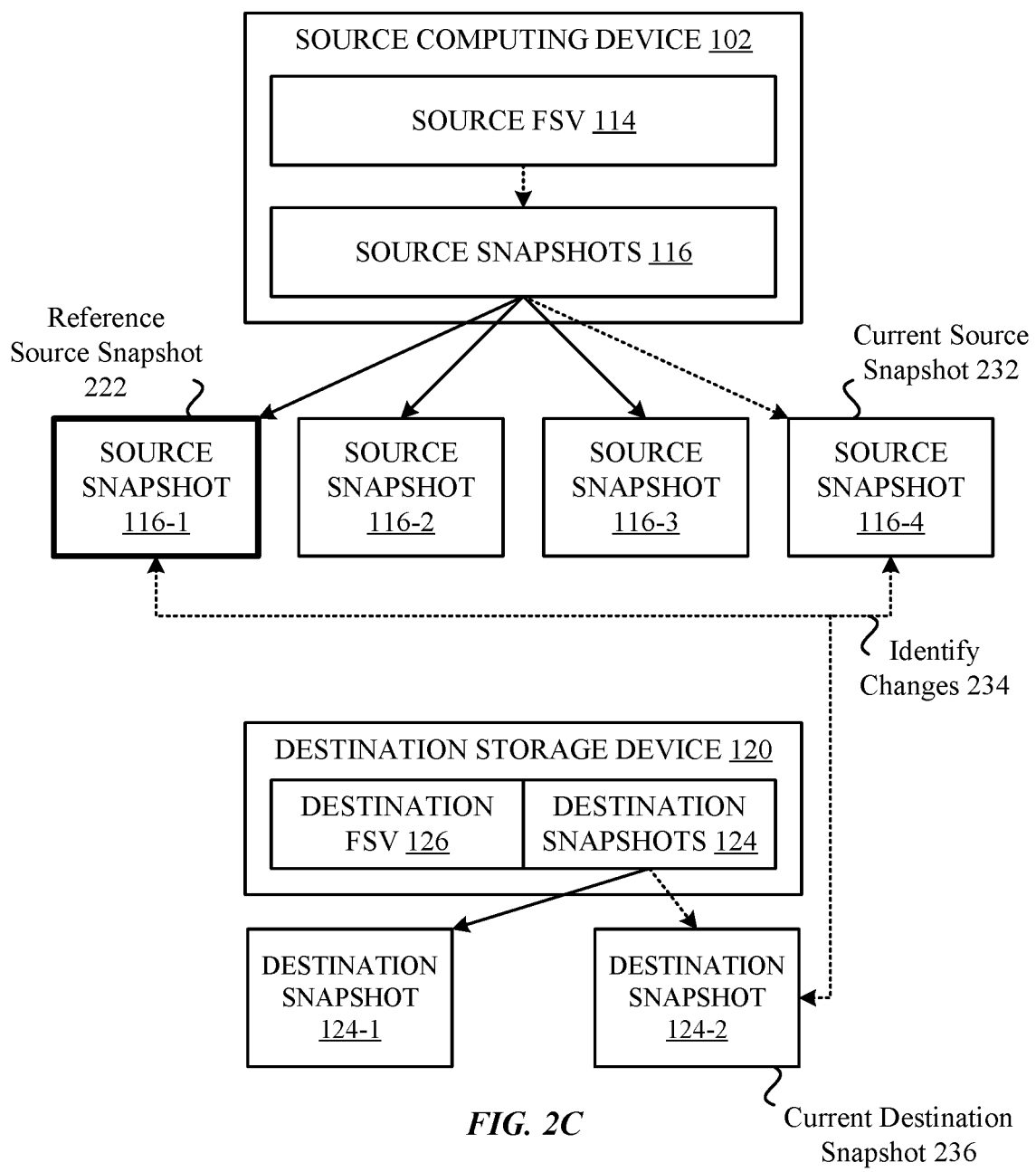

Next, in FIG. 2C, a third step 230 can involve the source computing device 102 becoming communicatively coupled with the destination storage device 120, e.g., when the source computing device 102 joins a network to which the destination storage device 120 is connected, when the destination storage device 120 is brought online, and so on. As previously described above, this can also simply involve a particular condition occurring in which the file system manager 110 is configured to perform a remote backup, e.g., based on a time interval, user inactivity, power availability (e.g., battery vs. plugged in), and so on. In any case, the file system manager 110 can initiate a remote backup that will update the backed-up data stored on the destination storage device 120 to establish an updated restore point.

As shown in FIG. 2C, the file system manager 110 can be configured to generate an additional source snapshot 116-4—labeled "current source snapshot 232" in FIG. 2C—to establish an immutable representation of the source file system volume 114 at the commencement of the remote backup. In turn, the file system manager 110 can identify the reference source snapshot 222 (per the flag, as previously described above), and carry out a comparison between the current source snapshot 232 and the reference source snapshot 222 to identify the changes that need to be propagated to the destination storage device 120 (represented by element 234 in FIG. 2C). According to some embodiments, the file system manager 110 can be configured to reference a file system event log associated with the source file system volume 114 to increase the efficiency by which the file system manager 110 is able to identify the changes that have occurred since the reference source snapshot 222 was established. For example, the file system manager 110 can identify write/delete operations performed within the source file system volume 114 to increase the efficiency by which the changes are identified. According to some embodiments, when the file system log is not available, the file system manager 110 can fall back and perform a fine-granularity comparison of the items within the reference source snapshot 222 and the current source snapshot 232 to identify the changes that have occurred. In any case, the file system manager 110 can also cause an additional destination snapshot 124-2—labeled "current destination snapshot 236" in FIG. 2C—to be established within the destination storage device 120.

Although not illustrated in FIG. 2C, it is noted that establishing the current destination snapshot 236 can involve mounting destination file system volume 126 so that the current destination snapshot 236 can be generated from the destination file system volume 126. It is also noted that, at least initially, the current destination snapshot 236 will not include any changes as the destination file system volume 126 has remained in a static state since the destination snapshot 124-1 was established (in accordance with step 210 of FIG. 2A, described above). It is further noted that the file system manager 110 can avoid simply copying the current source snapshot 232 into the current destination snapshot 236, as files that might have been deleted from the source file system volume 114 (e.g., across the times at which the source snapshots 116-2, 116-3, and 116-4 are established) might not be accounted for using this approach. Instead, the file system manager 110 can be configured to carry out a particular technique in which the changes are identified and appropriately accounted for within the current destination snapshot 236, which is described below in greater detail.

As noted above, the file system manager 110 can be configured to carry out a specific process to properly account for any changes (e.g., creations, modifications, deletions, etc.) that have taken place between the times at which the reference source snapshot 222 and the current source snapshot 232 are established. According to some embodiments, the file system manager 110 can be configured to identify, within the destination file system volume 126, a directory that corresponds to the source file system volume 114 (e.g., labeled "<Comp_Name>.backup"), and label the directory as a previous directory (e.g., "<Comp_Name>.previous"). Next, the file system manager 110 can be configured to create a temporary directory (e.g., "<Comp_Name>.in_progress") within the destination file system volume 126. At this juncture, the previous directory includes the content of the source file system volume 114 that corresponds to the time at which the destination snapshot 124-1 was established, and the goal is to update the temporary directory to include the content of the source file system volume 114 in accordance with the current source snapshot 232.

To achieve this goal, the file system manager 110 can be configured to parse each item (e.g., folder, file, etc.) included in the current source snapshot 232 to identify whether the item has changed since the reference source snapshot 222 was generated. If the item has not changed, the file system manager 110 can (1) identify the corresponding item within the previous directory, and (2) update the path of the item to point into the temporary directory. Alternatively, when the item has changed, the file system manager 110 can copy the corresponding item (from the source computing device 102) into the temporary directory. According to some embodiments, the file system manager 110 can use this copy-based approach on items that do not exceed a size threshold (e.g., one megabyte or less), which, in some cases, can be more efficient than consuming resources to identify fine-granularity level changes that have been made to the items. Alternatively, the file system manager 110 can be configured to implement a more efficient approach when encountering items that exceed the size threshold, in as it can prudent to identify fine-level granularity changes to increase the efficiency by which the remote backup is executed. According to some embodiments, this approach can involve the file system manager 110 obtaining, for a given item, (1) a physical block map for the item from the reference source snapshot 222, and (2) a physical block map for the item from the current source snapshot 232. In turn, the file system manager 110 can compare the block map to identify one or more ranges that have changed, and copy only those changes into the corresponding file at the destination storage device 120.

Finally, when the file system manager 110 has completed parsing the items included in the current source snapshot 232, the file system manager 110 can delete the previous directory (again, named "<Comp_Name>.previous"), which, at this point, should only include files that have been deleted from the source file system volume 114 since the reference source snapshot 222 was generated. Additionally, the file system manager 110 can convert the temporary directory (again, named "<Comp_Device>.in_progress") to a finalized directory, e.g., by renaming the temporary directory to "<Comp_Device.backup". It is additionally noted that the file system manager 110 can establish additional destination snapshots 124 before, during, and/or after the remote backup procedure to increase the overall stability by which it is executed, and that the current destination snapshot 236 (illustrated in FIG. 2C) can represent these destination snapshots 124. For example, the file system manager 110 can be configured to establish a destination snapshot 124 prior to performing a remote backup in order to establish an immutable copy of the destination file system volume 126. In this manner, the remote backup can be efficiently rolled back under failure scenarios, e.g., when the destination storage device 120 suddenly becomes inaccessible to the source computing device 102, when an error occurs (e.g., the source computing device 102 freezes), and so on. Additionally, the file system manager 110 can be configured to establish a destination snapshot 124 at the conclusion of each remote backup to establish a logical separation point for the next remote backup that will occur down the line. For example, this destination snapshot 124 can correspond to the reference source snapshot managed by the source computing device 102.

Figure 2D:
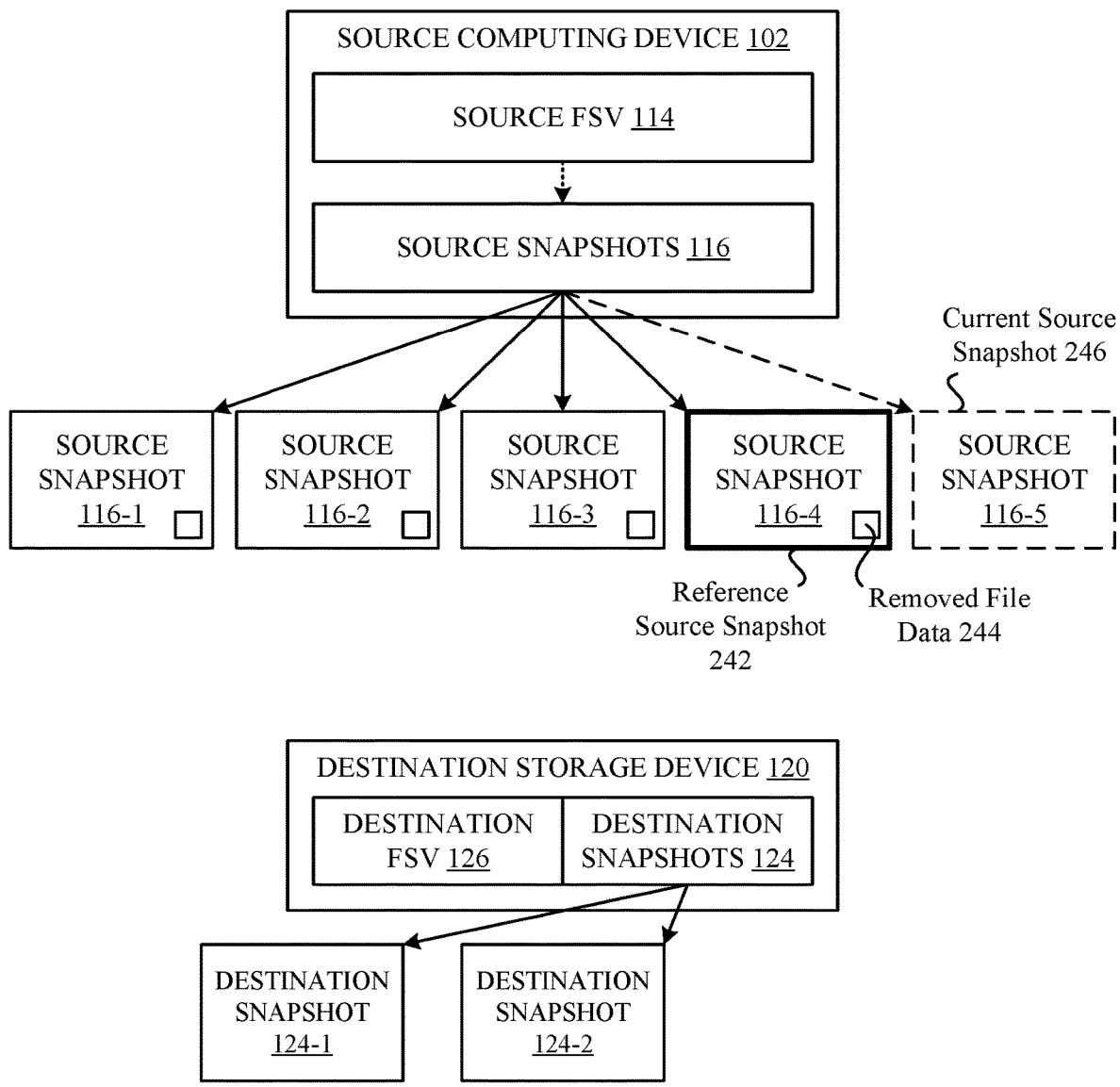

Next, in FIG. 2D, a fourth step 240 can involve the source computing device 102 encountering a local storage space issue (e.g., within the storage 112) while attempting to perform an additional remote backup. As previously described herein, the file system manager 110 can be configured to generate a source snapshot 116 each time a backup (both local and remote) is executed. Over time, the storage space consumed by the source file system volume 114 itself—as well as the storage space consumed by the source snapshots 116 that are generated in accordance with the local/remote backups—can establish a scenario in which there is insufficient storage space to accommodate a source snapshot 116 that the file system manager 110 is attempting to generate in conjunction with a local/remote backup. Accordingly, the file system manager 110 can be configured to cure this deficiency by carving out file data that is stored within one or more of the source snapshots 116. In particular, the file system manager 110 can be configured to remove file data (e.g., binary data of actual file content) from a given source snapshot 116, while keeping the metadata for the files intact within the source snapshot 116. As previously described herein, the metadata can include any subset of information content associated with the content included in the source file system volume (e.g., directory structures (e.g., folder/file hierarchies), file properties (e.g., name, dates, permissions, extended attributes), etc.). As described in greater detail below, by retaining the metadata, the file system manager 110 can continue to utilize the source snapshot 116 when attempting to identify changes that have occurred to the source file system volume 114 between the establishment times for both the source snapshot 116 and a current snapshot 116.

Additionally, it is noted that the file system manager 110 can be configured to operate in conjunction with an available amount of storage space at the destination storage device 120 when performing the remote backups described herein. For example, prior to generating destination snapshots 124—as well as updating the content of the destination file system volume 126—the file system manager 110 can establish an estimate for an amount of memory space that will be required at the destination storage device 120 to perform a remote backup. In turn, the file system manager 110 can interface with the destination storage device 120 to identify whether a sufficient amount of memory space is available to accommodate the remote backup (based on the established estimate). When a sufficient amount of memory space is not available, the file system manager 110 can delete older destination snapshots 124 to free up additional memory space within the destination storage device 120 so that the remote backup can be performed. According to some embodiments, the file system manager 110 can be configured to query a user (of the source computing device 102) prior to deleting older destination snapshots 124 to ensure that particular restore points relied upon by the user are not eliminated without the user's consent.

Returning now to FIG. 2D, the file system manager 110 identifies that there is insufficient storage space available for establishing a source snapshot 116-5 (labeled "current source snapshot 246" in FIG. 2D) in conjunction with performing the additional remote backup. In turn, the file system manager 110 can identify one or more of the source snapshots 116 and carve out the file data while leaving the file metadata intact (as described herein). For example, the file system manager 110 can start with the oldest source snapshot 116 when carving out the file data, and move through the snapshots (in an oldest to newest order) while carving out the file data until a sufficient amount of available storage space is established for performing the additional remote backup. As shown in FIG. 2D, the example scenario can involve carving out the data of the source snapshots 116-1 to 116-4, where the source snapshot 116-4 is flagged as a reference source snapshot 242 (as described above in conjunction with FIG. 2C). For example, as shown in FIG. 2D, the carved-out file data of the source snapshot 116-4 is represented in FIG. 2D as removed file data 244.

Again, as previously described herein, the file system manager 110 can be configured to keep the file metadata intact within the reference source snapshot 242 when removing the file data. As described in greater detail below in conjunction with FIG. 2E, this intact file metadata can enable the file system manager 110 to effectively identify the changes that have occurred since the reference source snapshot 242 was established (illustrated as identify changes 254 in FIG. 2E). Moreover, the removed file data 244 can establish a sufficient amount of storage space for generating/storing the current source snapshot 246. However, if sufficient storage space is unavailable, the file system manager 110 can be configured to perform similar removals of file data from other source snapshots 116 until the requisite amount of storage space is available. Alternatively, if the requisite amount of storage space cannot be established through the file data removal techniques described herein, the file system manager 110 can fall back and iterate the source file system volume 114 against the destination file system volume 126 (associated with the most recent destination snapshot 124) to identify the changes.

Figure 2E:
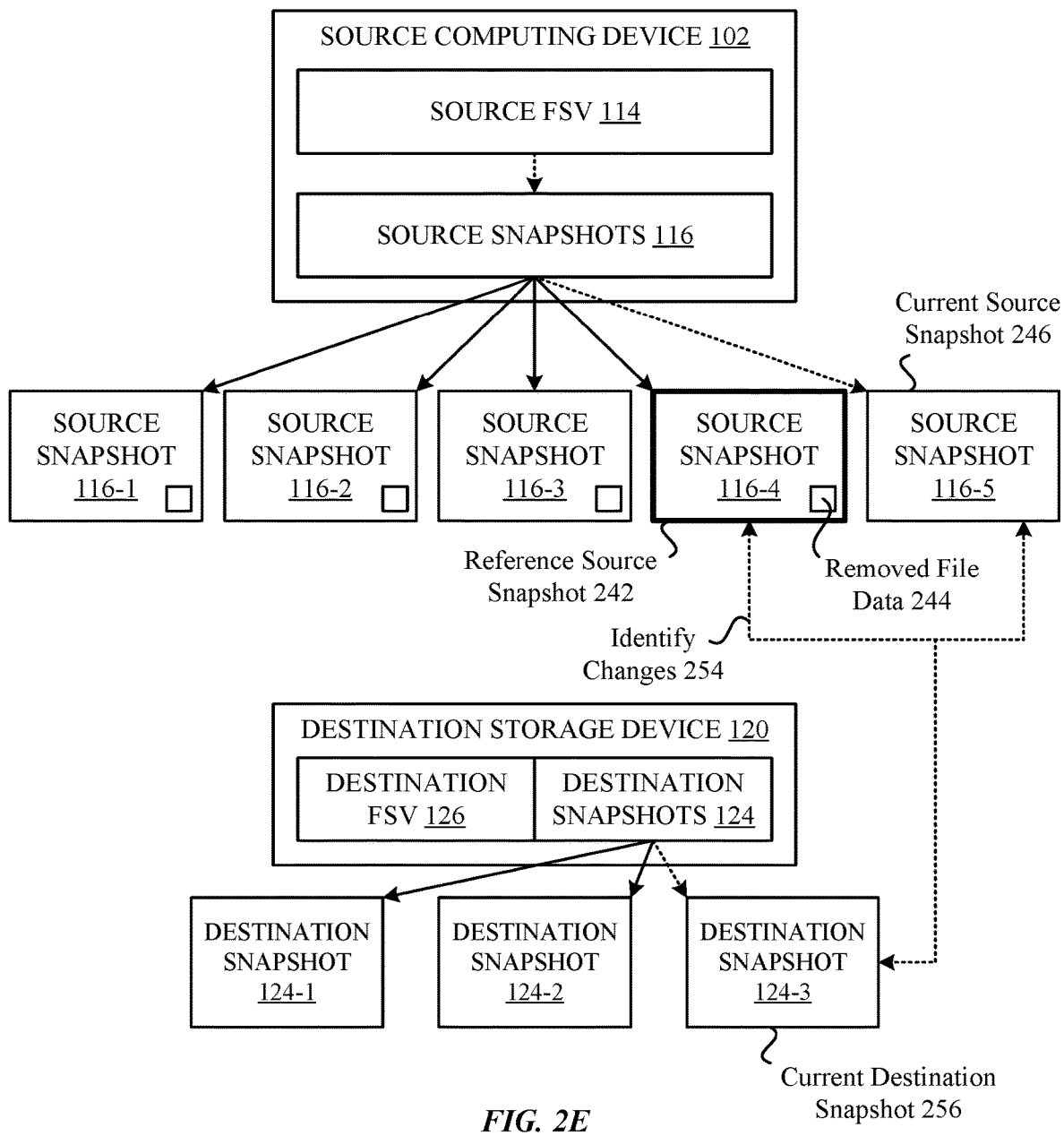

Next, in FIG. 2E, a fifth step 250 can involve the file system manager 110 performing the additional remote backup in conjunction with the sufficient amount of storage space being made available by way of the removed file data 244 from the reference source snapshot 242. As shown in FIG. 2E, the file system manager 110 can identify changes between the current source snapshot 246 and the reference source snapshot 242 (using the techniques described herein), and establish destination snapshot(s) 124-3—labeled "current destination snapshot 256" in FIG. 2E—into which the changes are reflected (e.g., in accordance with the techniques described above in conjunction with FIG. 2C). Thus, at the conclusion of FIG. 2E, a third remote backup has been successfully performed even though the file data has been removed from the reference source snapshot 242. In this manner, the file system manager 110 can continue to perform the local/remote backup procedures described herein in an efficient manner even when the file system manager 110 faces storage constraints that would otherwise render the backup procedures unviable.

Figure 2F:
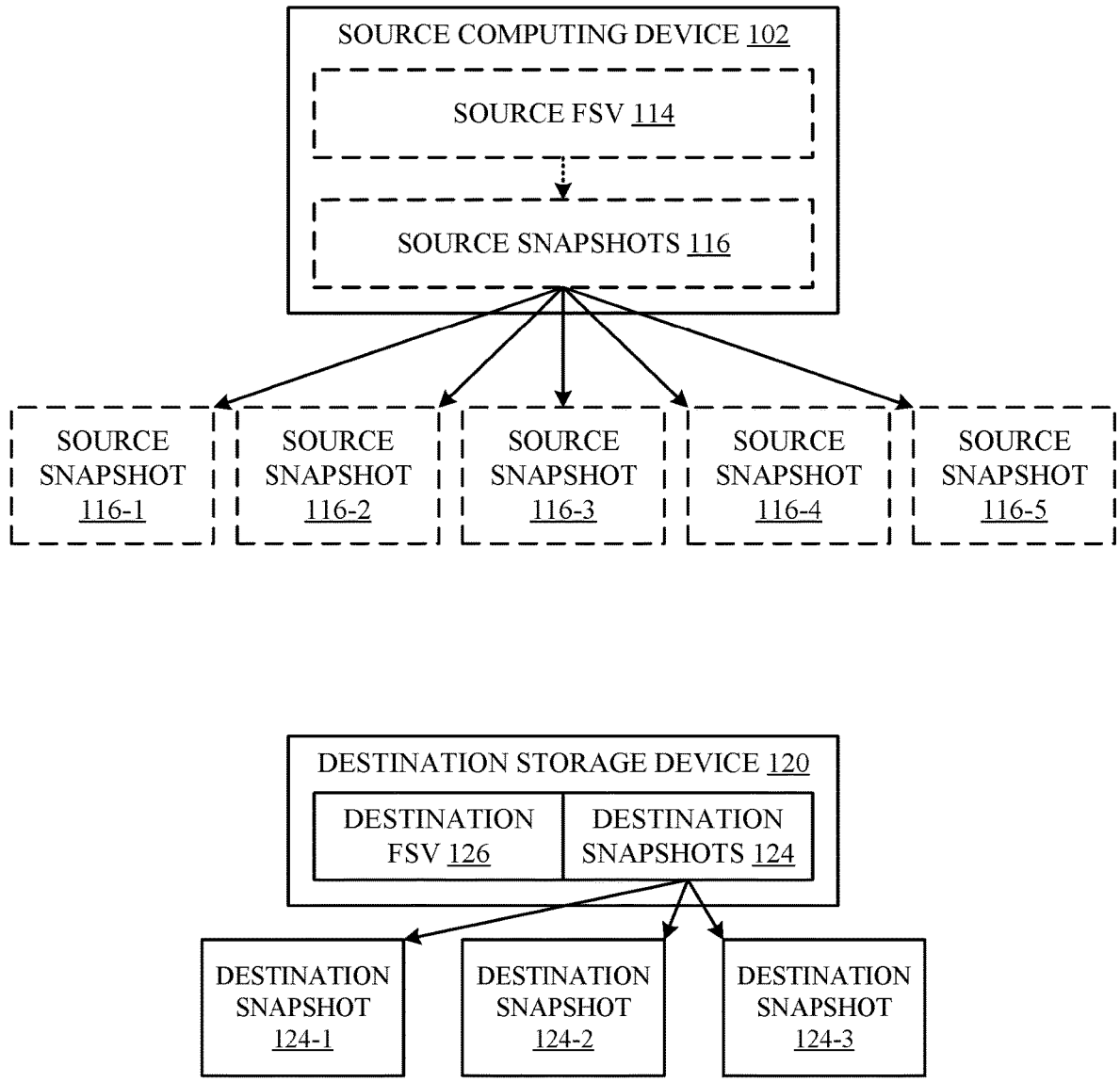

Additionally, as previously described herein, situations can arise in which it can be necessary to utilize the various source snapshots 116/destination snapshots 124 to carry out restoration operations. For example, one or more files/folders within the source file system volume 114 might be inadvertently modified or deleted, in which case it can be desirable to restore the source file system volume 114 to a recently-backed up state to undo the modifications/deletions. In yet another example, the source computing device 102 on which the source file system volume 114 is installed can be lost or damaged, in which case it can be desirable to restore the source file system volume 114 to a new/different source computing device 102. In yet another example, the source file system volume 114 can become corrupted, deleted, and so on. Accordingly, as shown in FIG. 2F, a sixth step 260 captures this example scenario, where the source file system volume 114—as well as the various source snapshots 116 (established by way of the local/remote backups described in conjunction with FIGS. 2A-2E)—become corrupted or deleted or are otherwise desired to be accessed. Fortunately, various destination snapshots 124 can be utilized to restore files, as described below in greater detail in conjunction with FIG. 2G.

Figure 2G:
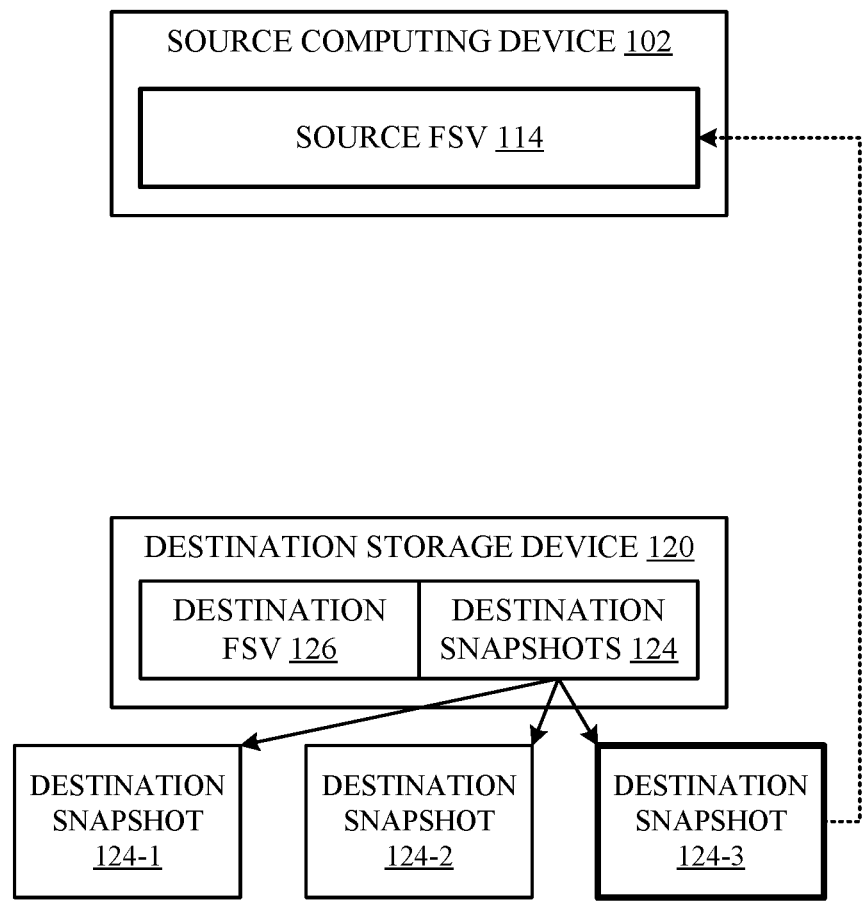
Figure 2H:
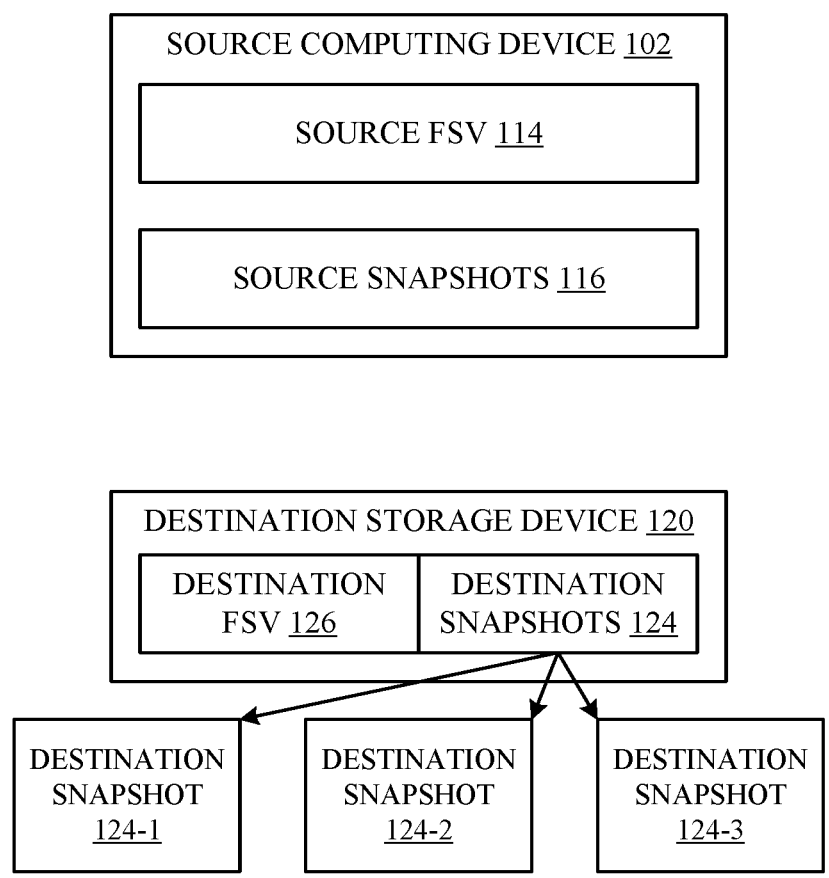

As shown in FIG. 2G, a seventh step 270 can involve the source computing device 102 restoring the source file system volume 114 based on the destination snapshot 124-3. According to some embodiments, the source computing device 102 can be configured to load a recovery OS for execution to carry out the restoration procedure. For example, the recovery OS can be accessed by mounting a recovery OS file system volume (not illustrated in FIG. 1) at the source computing device 102, which involves performing procedures that enable the contents of the recovery OS file system volume to be accessible at the source computing device 102. In this manner, the recovery OS can enable the source computing device 102 to carry out a variety of recovery operations, including restoring the source file system volume 114 based on the destination snapshot 124-3. As a result, the source file system volume 114 can be restored to a recent state on the source computing device 102, and return to an operable mode, which is illustrated in FIG. 2H. For example, the file system manager 110, upon restoring operability, can establish supplemental source snapshots 116 through local/remote backups—as well as additional destination snapshots 124 through remote backups—to enable meaningful restoration procedures to be carried out when necessary down the line.

Accordingly, FIGS. 2A-2H provide a detailed breakdown of various example scenarios in which the source computing device 102 can interface with the destination storage device 120 to implement the techniques described herein. A high-level breakdown of these various techniques will now be discussed below in conjunction with FIGS. 3A-3B, with reference to FIGS. 2A-2H.

Figure 3A:
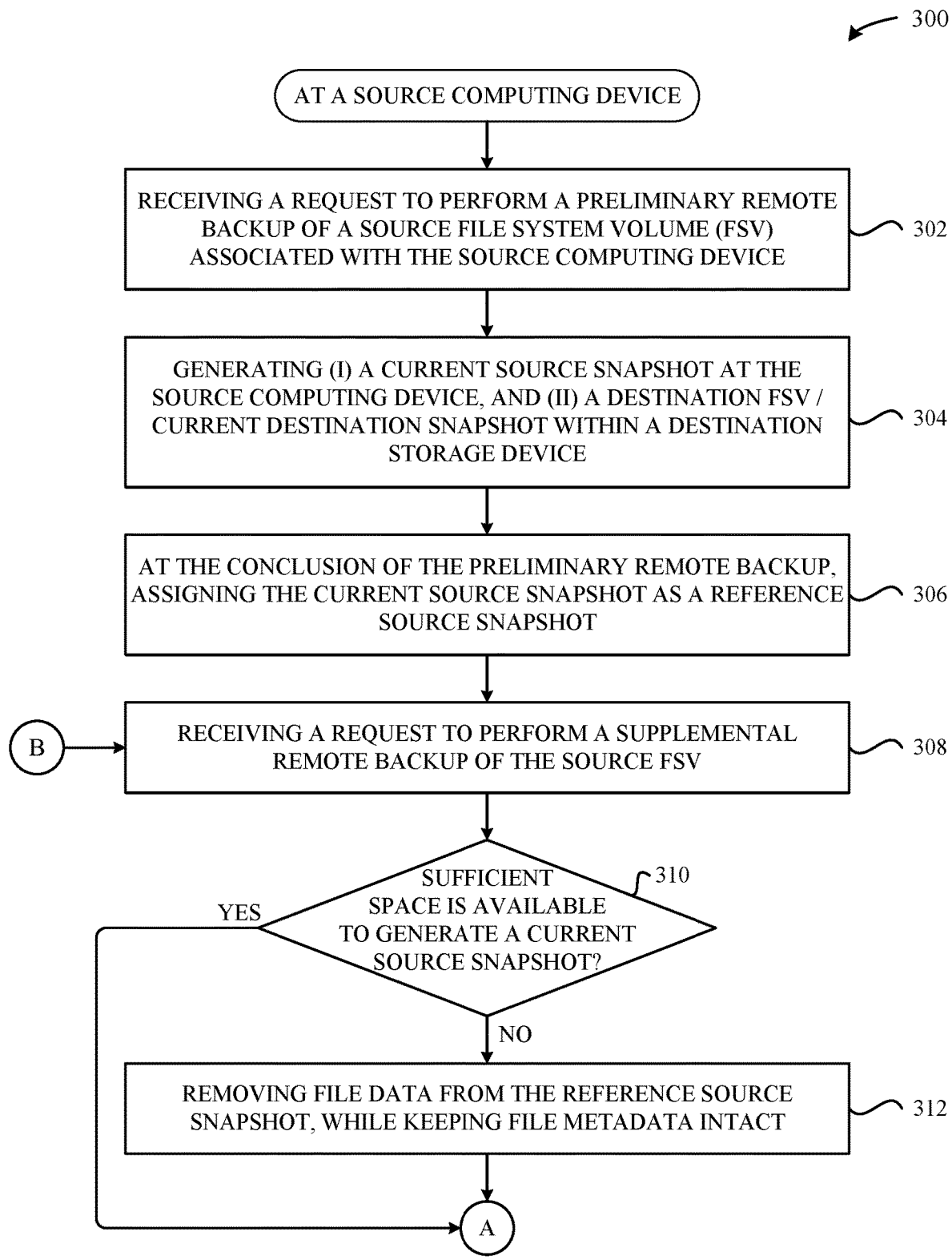
FIGS. 3A-3B illustrate a method for a source computing device to perform both local and remote backups over a period of time, according to some embodiments.
Figure 3B:
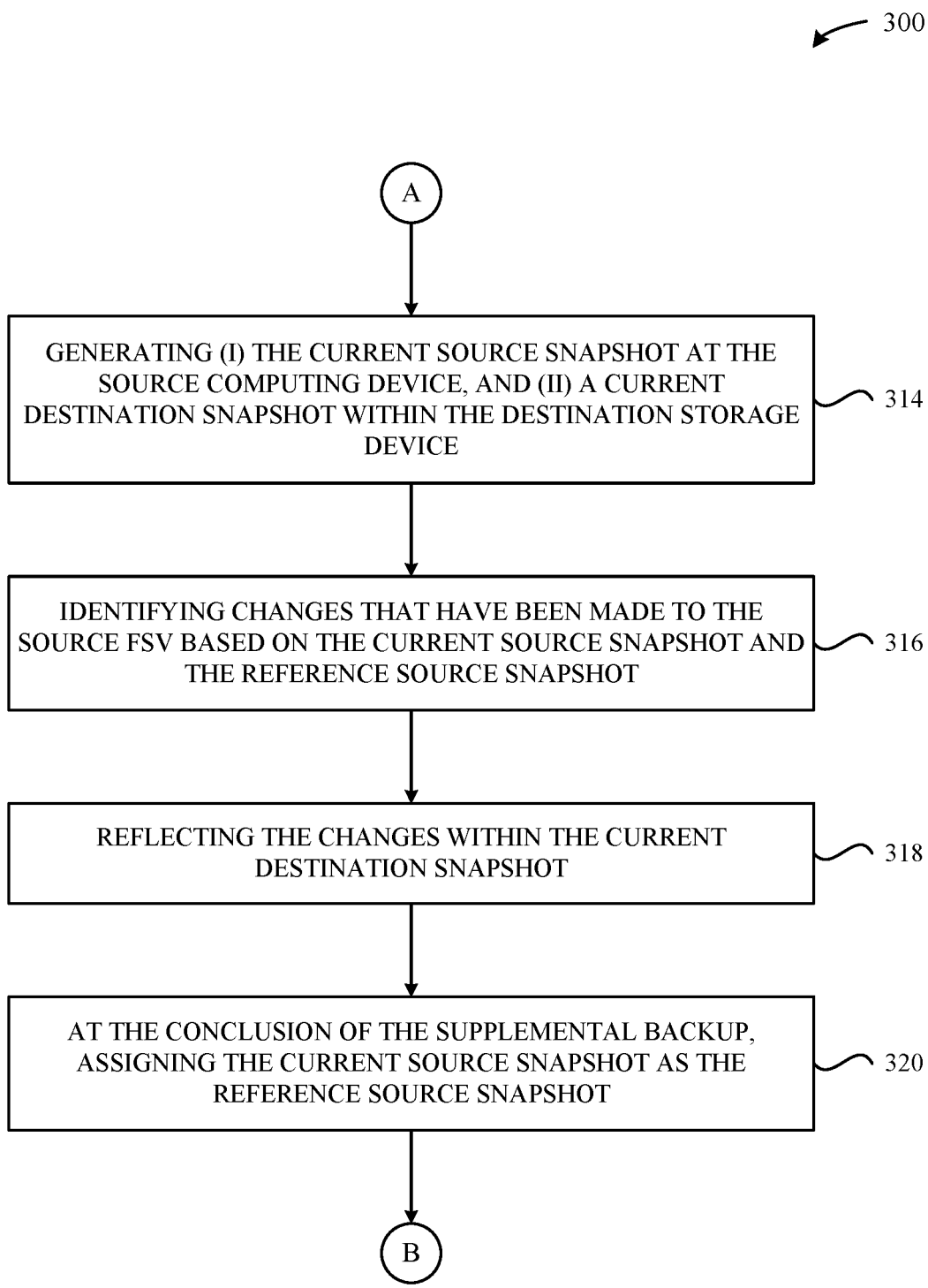

FIGS. 3A-3B illustrate a method 300 for a source computing device 102 to perform both local and remote backups, according to some embodiments. As shown in FIG. 3A, the method 300 begins at step 302, where the file system manager 110 receives a request to perform a preliminary remote backup of a source FSV (e.g., the source file system volume 114) associated with the source computing device 102 (e.g., as described above in conjunction with FIG. 2A). At step 304, the file system manager 110 generates (i) a current source snapshot 116 at the source computing device 102, and (ii) a destination FSV (e.g., the destination file system volume 126)/a current destination snapshot 124 within a destination storage device 120, where the current destination snapshot 124 is based on the current source snapshot 116 (e.g., as described above in conjunction with FIG. 2A). At step 306, the file system manager 110, at the conclusion of the preliminary remote backup, assigns the current source snapshot 116 as a reference source snapshot 116 (e.g., as described above in conjunction with FIGS. 2A-2B).

At step 308, the file system manager 110 receives a request to perform a supplemental remote backup of the source FSV (e.g., as described above in conjunction with FIG. 2D). At step 310, the file system manager 110 determines whether sufficient space is available to generate a current source snapshot 116 (e.g., as described above in conjunction with FIG. 2D). If, at step 310, the file system manager 110 determines that sufficient space is available to generate a current source snapshot 116, then the method 300 proceeds to step 314, which is described below in conjunction with FIG. 3B. Otherwise, the method 300 proceeds to step 312, where the file system manager 110 removes file data from the reference source snapshot 116, while keeping file metadata intact (e.g., as described above in conjunction with FIG. 2D).

At step 314, the file system manager 110 generates (i) the current source snapshot 116 at the source computing device 102, and (ii) a current destination snapshot 124 within the destination storage device 120 (e.g., as described above in conjunction with FIG. 2C). At step 316, the file system manager 110 identifies changes that have been made to the source FSV based on the current source snapshot 116 and the reference source snapshot 116 (e.g., as described above in conjunction with FIG. 2C). At step 318, the file system manager 110 reflects the changes within the current destination snapshot 124 (e.g., as described above in conjunction with FIG. 2C). Finally, at step 320, the file system manager 110, at the conclusion of the supplemental backup, assigns the current source snapshot 116 as the reference source snapshot 116 (e.g., as described above in conjunction with FIG. 2C). The method 300 can then return to step 308, where requests to perform supplemental backups are received at the source computing device 102.

Figure 4:
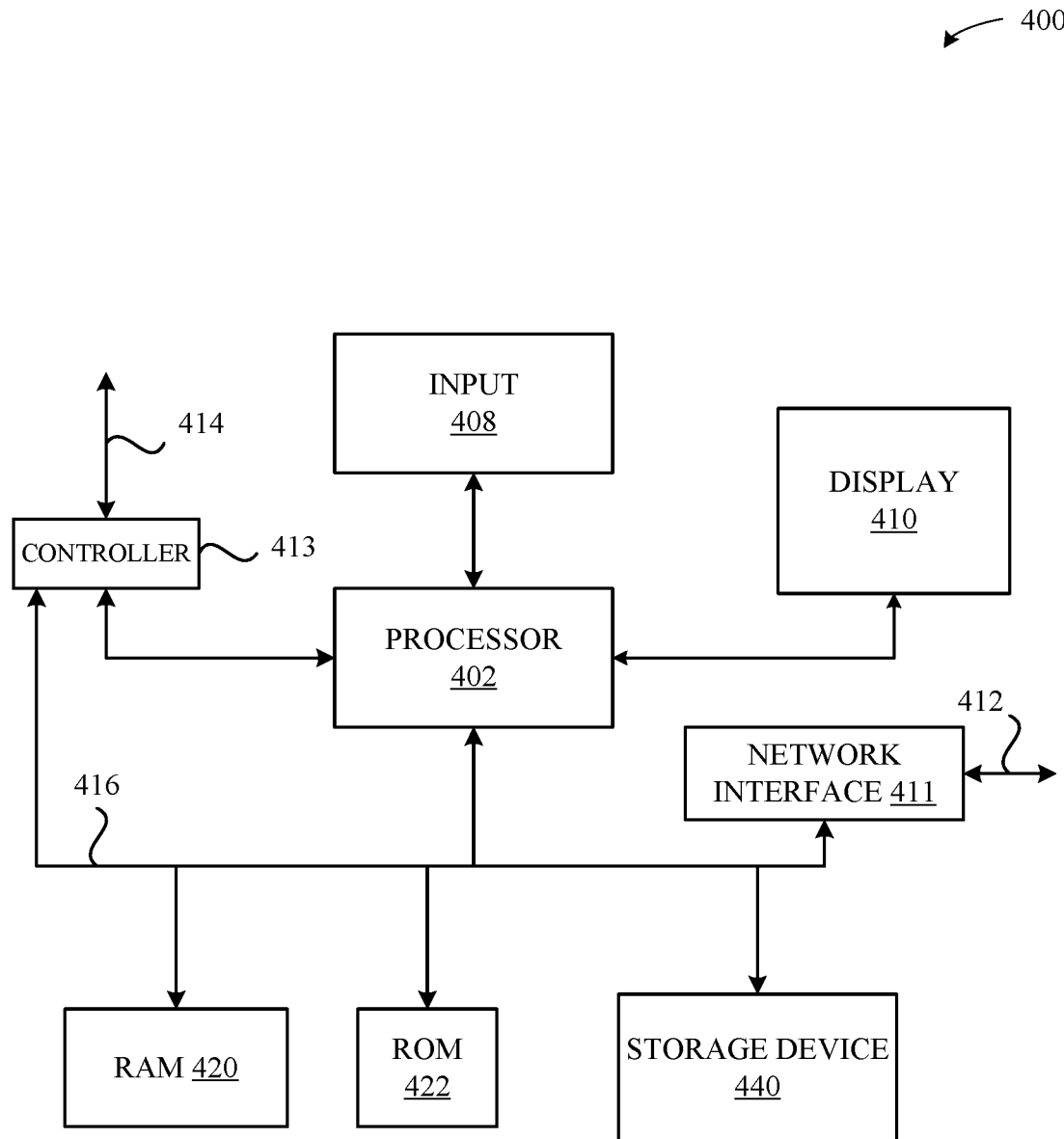
FIG. 4 illustrates a detailed view of components that can be included in the computing device illustrated in FIG. 1, according to some embodiments.

FIG. 4 illustrates a detailed view of a computing device 400 that can be used to implement the various techniques described herein, according to some embodiments. In particular, the detailed view illustrates various components that can be included in the source computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing a backup of a source file system volume (FSV) associated with a source computing device, the method comprising, at the source computing device:
   in response to identifying that an amount of available storage space is insufficient for generating a current snapshot:
      removing, from a previous snapshot, data for files of the source FSV to establish a sufficient amount of available storage space for generating the current snapshot, such that the previous snapshot includes metadata for files within the source FSV but does not include the data for the files within the source FSV;
      generating the current snapshot of the source FSV, wherein the current snapshot complements the previous snapshot of the source FSV;
   generating, within a destination storage device, a second snapshot of a destination FSV, wherein the source FSV corresponds to the destination FSV;
   identifying changes that have been made to the source FSV based on the current snapshot and the previous snapshot; and
   reflecting the changes within the second snapshot of the destination FSV.

2. The method of claim 1, further comprising:
   excluding at least one file from the backup based on its type, and/or location within the source FSV.

3. The method of claim 1, wherein identifying the changes comprises:
   identifying a change to a source file that occurred between the current snapshot and the previous snapshot, wherein a size of the source file satisfies a threshold;
   obtaining (i) a first physical block map for the source file based on the current snapshot, and (ii) a second physical block map for the source file based on the previous snapshot;
   identifying, based on the first physical block map and the second physical block map, at least one block that has changed within the source file;
   identifying a destination file that corresponds to the source file; and
   reflecting the change to the at least one block within the destination file.

4. The method of claim 3, wherein reflecting the change to the at least one block within the destination file comprises:
   cloning the destination file to establish a cloned destination file;
   reflecting the change to the at least one block within the cloned destination file; and
   renaming the cloned destination file in accordance with the destination file.

5. The method of claim 1, further comprising, prior to identifying that the amount of available storage space is insufficient for generating the current snapshot:
   generating the previous snapshot, wherein the previous snapshot includes both (i) the metadata for files within the source FSV, and (ii) data for the files within the source FSV; and
   generating the destination FSV based on the previous snapshot of the source FSV.

6. The method of claim 1, wherein the data for files of the source FSV comprises binary comprises binary data of actual file contents.

7. The method of claim 1, further comprising:
   generating a third destination snapshot of the destination FSV to finalize the backup.

8. At least one non-transitory computer readable storage medium configured to store instructions that, when executed by at least one processor included in a source computing device, cause the source computing device to perform a backup of a source file system volume (FSV) associated with the source computing device, by carrying out steps that include:
   in response to identifying that an amount of available storage space is insufficient for generating a current snapshot:
      removing, from a previous snapshot, data for files of the source FSV to establish a sufficient amount of available storage space for generating the current snapshot, such that the previous snapshot includes metadata for files within the source FSV but does not include the data for the files within the source FSV;
      generating the current snapshot of the source FSV, wherein the current snapshot complements the previous snapshot of the source FSV;
   generating, within a destination storage device, a second snapshot of a destination FSV, wherein the source FSV corresponds to the destination FSV;
   identifying changes that have been made to the source FSV based on the current snapshot and the previous snapshot; and
   reflecting the changes within the second snapshot of the destination FSV.

9. The at least one non-transitory computer readable storage medium of claim 8, wherein the steps further include:
   excluding at least one file from the backup based on its type, and/or location within the source FSV.

10. The at least one non-transitory computer readable storage medium of claim 8, wherein identifying the changes comprises:
    identifying a change to a source file that occurred between the current snapshot and the previous snapshot, wherein a size of the source file satisfies a threshold;
    obtaining (i) a first physical block map for the source file based on the current snapshot, and (ii) a second physical block map for the source file based on the previous snapshot;

identifying, based on the first physical block map and the second physical block map, at least one block that has changed within the source file;

identifying a destination file that corresponds to the source file; and reflecting the change to the at least one block within the destination file.

11. The at least one non-transitory computer readable storage medium of claim 10, wherein reflecting the change to the at least one block within the destination file comprises:

cloning the destination file to establish a cloned destination file;

reflecting the change to the at least one block within the cloned destination file; and renaming the cloned destination file in accordance with the destination file.

12. The at least one non-transitory computer readable storage medium of claim 8, wherein the steps further include, prior to identifying that the amount of available storage space is insufficient for generating the current snapshot:

generating the previous snapshot, wherein the previous snapshot includes both (i) the metadata for files within the source FSV, and (ii) data for the files within the source FSV; and generating the destination FSV based on the previous snapshot of the source FSV.

13. The at least one non-transitory computer readable storage medium of claim 8, wherein the data for files of the source FSV comprises binary comprises binary data of actual file contents.

14. The at least one non-transitory computer readable storage medium of claim 8, wherein the changes are identified based on an event log associated with the source FSV.

15. A source computing device configured to perform a backup a source file system volume (FSV) associated with the source computing device, the source computing device comprising:

at least one processor; and at least one memory configured to store instructions that, when executed by the at least one processor, cause the source computing device to:

in response to identifying that an amount of available storage space is insufficient for generating a current snapshot:

remove, from a previous snapshot, data for files of the source FSV to establish a sufficient amount of available storage space for generating the current snapshot, such that the previous snapshot includes metadata for files within the source FSV but does not include the data for the files within the source FSV;

generate the current snapshot of the source FSV, wherein the current snapshot complements the previous snapshot of the source FSV;

generate, within a destination storage device, a second snapshot of a destination FSV, wherein the source FSV corresponds to the destination FSV;

identify changes that have been made to the source FSV based on the current snapshot and the previous snapshot; and reflect the changes within the second snapshot of the destination FSV.

16. The source computing device of claim 15, wherein the at least one processor further causes the source computing device to:

exclude at least one file from the backup based on its type, and/or location within the source FSV.

17. The source computing device of claim 15, wherein identifying the changes comprises:

identifying a change to a source file that occurred between the current snapshot and the previous snapshot, wherein a size of the source file satisfies a threshold;

obtaining (i) a first physical block map for the source file based on the current snapshot, and (ii) a second physical block map for the source file based on the previous snapshot;

identifying, based on the first physical block map and the second physical block map, at least one block that has changed within the source file;

identifying a destination file that corresponds to the source file; and reflecting the change to the at least one block within the destination file.

18. The source computing device of claim 17, wherein reflecting the change to the at least one block within the destination file comprises:

cloning the destination file to establish a cloned destination file;

reflecting the change to the at least one block within the cloned destination file; and renaming the cloned destination file in accordance with the destination file.

19. The source computing device of claim 15, wherein the at least one processor further causes the source computing device to, prior to identifying that the amount of available storage space is insufficient for generating the current snapshot:

generate the previous snapshot, wherein the previous snapshot includes both (i) the metadata for files within the source FSV, and (ii) data for the files within the source FSV; and generate the destination FSV based on the previous snapshot of the source FSV.

20. The source computing device of claim 15, wherein the data for files of the source FSV comprises binary comprises binary data of actual file contents.

* * * * *